United States Patent [19]

Jackson, Jr. et al.

[11] Patent Number: 4,600,768

[45] Date of Patent: Jul. 15, 1986

[54] AROMATIC POLYESTERS DERIVED FROM 2,3-BUTANEDIOL

[75] Inventors: Winston J. Jackson, Jr.; Joseph J. Watkins, both of Kingsport, Tenn.

[73] Assignee: Eastman Kodak Company, Rochester, N.Y.

[21] Appl. No.: 789,281

[22] Filed: Oct. 18, 1985

[51] Int. Cl.$^4$ .............................................. C08G 63/02
[52] U.S. Cl. .................... 528/308; 528/272; 528/302; 528/305; 528/308.1; 528/308.7
[58] Field of Search ............... 528/272, 302, 305, 308, 528/308.1, 308.7

[56] References Cited

U.S. PATENT DOCUMENTS 3,890,279 6/1975 Wolfe .............................. 528/308 X Primary Examiner—Lucille M. Phynes
Attorney, Agent, or Firm—J. Frederick Thomsen; William P. Heath, Jr.

[57] ABSTRACT

Disclosed are polyesters derived from one or more aromatic dicarboxylic acids and a diol which includes at least 50 mol percent of 2,3-butanediol. The polyesters, prepared by the use of a tin catalyst, are high molecular weight polymers having an inherent viscosity of at least 0.4.

4 Claims, No Drawings

AROMATIC POLYESTERS DERIVED FROM 2,3-BUTANEDIOL

This invention relates to certain novel, high-molecular weight polyesters derived from aromatic dicarboxylic acids and 2,3-butanediol.

Heretofore, high-molecular weight polyesters derived from one or more dicarboxylic acids and 2,3-butanediol have not been known, primarily because of the absence of a suitable means or process for their preparation. U.S. Pat. No. 2,502,686 discloses the preparation of low-molecular weight (1000-3000) polyesters from phthalic acid and 2,3-butanediol. The low-molecular weight of these known polyesters renders them unsuitable for use in the preparation of shaped articles such as film and sheeting. The use of 2,3-butanediol as a glycol modifier in poly(ethylene terephthalate) is described in U.S. Pat. No. 3,714,126. However, the maximum level of the 2,3-butanediol is 8 mol percent.

The novel polyesters of this invention are comprised of repeat units from an aromatic dicarboxylate moiety and 2,3-butanediol wherein at least 50 mol percent of the glycol component is 2,3-butanediol, said polyester having an inherent viscosity of at least 0.4 when measured at 25° C. in a mixture of 60 parts by weight phenol and 40 parts by weight 1,1,2,2-tetrachloroethane. In contrast to the low-molecular polyesters described in U.S. Pat. No. 2,502,686, our novel polyesters have molecular weights over 6,000. The novel polyesters may be injection molded or extruded by conventional techniques to produce transparent shaped objects, sheeting and film. The polyesters also can be dissolved in solvents to prepare coating compositions. Depending on the particular end use for which the polyesters provided by this invention are designed, they may contain pigments, glass fibers, antioxidants, plasticizers, lubricants and other additives.

The polyesters of our invention are comprised of repeating units from one or more aromatic dicarboxylic acids and 2,3-butanediol. The dicarboxylic acid residue is normally derived from terephthalic acid, isophthalic acid, naphthalenedicarboxylic acids such as 2,6-naphthalenedicarboxylic acid, 4,4'-diphenyldicarboxylic acid, or a mixture thereof. Minor amounts, e.g., up to 25 mol percent of the total dicarboxylate moieties, of other dicarboxylic acid residues such as an aliphatic dicarboxylic acid or an alicyclic dicarboxylic acid may be present.

Our novel polyesters contain at least 50 mol percent of 2,3-butanediol residues which may be derived from levo, dextro or meso 2,3-butanediol. When an optically-active form of 2,3-butanediol is used, the resulting polyester is optically active. Up to about 50 mol percent of the glycol component of the polyesters of our invention may be derived from other glycols such as 1,2-ethanediol, 1,2-propanediol, 1,3-propanediol, 2,2-dimethyl-1,3-propanediol, 1,4-butanediol and 1,4-cyclohexanedimethanol.

Our novel polyesters may be prepared by reacting an aromatic dicarboxylic acid or polyester-forming derivative thereof such as the dialkyl ester with an excess of 2,3-butanediol in the presence of a catalytic amount of a tin compound. As indicated above, minor amounts of another dicarboxylic acid may be used in conjunction with the aromatic dicarboxylic acid or mixtures thereof. The dicarboxylic acid residues or segments of our polyesters preferably are derived from dimethyl terephthalate. If desired, the polyesters may be prepared using as the glycol component only 2,3-butanediol or mixtures of 2,3-butanediol and another glycol containing from 2 to 20 carbon atoms such as one or more of the glycols set forth above.

The polyesters provided by our invention may be prepared in the melt under an inert or nonoxidizing atmosphere using conventional polyester-forming conditions of temperature and pressure. For example, a mixture of the dicarboxylic acid or ester and 2,3-butanediol or glycol mixture containing one or more other glycols can be heated at a temperature in the range of about 180° to 220° C. and at atmospheric or autogenous pressure to effect the initial (trans)-esterification reaction. The resulting mixture may then be converted to a polyester having a relatively high inherent viscosity by carrying out the polycondensation phase of the process at a temperature in the range of about 220° to 260° C. and under a reduced pressure of about 0.05 to 10 Torr.

A wide variety of tin compounds may be used as catalysts in preparing the polyesters of this invention. For example, the catalyst may be an inorganic tin compound such as a halide, an oxide, a salt or a metal stannate. Stannous and stannic chloride, stannous oxide, potassium and sodium stannate and stannous sulfate are typical inorganic compounds which may be employed. Alternatively, the catalyst may comprise one or more mono-, di-, tri- or tetraorganotin compounds. Examples of these organotin compounds include halides, e.g., trimethyltin chloride, tributyltin bromide, tribenzyltin chloride, butyltin trichloride, dibutyltin dibromide and, diphenyltin chloride; oxides, e.g., tributyltin oxide; hydroxides, e.g., triphenyltin hydroxide; alkoxides, e.g., dibutyltin dimethoxide; carboxylate salts, e.g., tributyltin acetate, tributyltin benzoate, butyltin trioctoate, dibutyltin diacetate, dibutyltin dioctoate and, dibutyltin dilaurate; and mercaptides such as dibutyltin bis(butylmercaptide) and dibutyltin bis(laurylmercaptide).

The preferred catalysts are selected from the alkylstannoic acids with butylstannoic acid being particularly preferred.

The catalytic amount of tin catalyst used can be varied substantially depending, for example, on the particular tin compound employed and on other variables such as the reaction conditions under which the process is carried out. The high molecular weight or degree of polymerization possessed by our novel polyesters generally may be achieved by using at least 800 ppm tin (as Sn). The use of less than about 600 ppm tin results in polyesters having low inherent viscosities similar to those prepared when using other catalysts. Although the upper limit on the amount of catalyst used is not critical, concentrations exceeding 10,000 ppm normally are not necessary. The preferred amount of catalyst is in the range of about 1500 to 5000 ppm. Other metallic condensation catalysts such as antimony, gallium, germanium, lead, titanium and zinc may be used in combination with one or more tin compounds in the synthesis of our novel polyesters.

Our novel polyesters and their preparation are further illustrated by the following examples.

All inherent viscosities set forth herein are determined at 25° C. in a 60/40 mixture of phenol and 1,1,2,2-tetrachloroethane at a concentration of 0.5 g/100 mol. Glass transition temperatures are determined on a Perkin-Elmer DSC-2 differential scanning calorimeter.

The invention will be further illustrated by the following Examples although it will be understood that these Examples are included merely for purposes of illustration and are not intended to limit the scope of the invention.

EXAMPLE 1

A mixture of 29.1 g (0.15 mol) dimethyl terephthalate, 40.5 g (0.45 mol) 2,3-butanediol, and 0.23 g (4,000 ppm Sn) n-butylstannoic acid is placed into a 100-mol, single-necked, round-bottomed flask equipped with a stainless steel stirrer and a short distillation head with provisions for maintaining a nitrogen flow and applying vacuum. The mixture is blanketed with nitrogen and the flask is immersed in a Belmont metal bath heated at 180° C. The mixture is stirred and heated for five hours at 180° C., five hours at 200° C., and four hours at 220° C. Vacuum is applied at 220° C. for three hours, then at 240° C. for one hour. An amber, transparent polyester with an I.V. of 0.41 and a Tg of 127° C. is obtained.

EXAMPLE 2

In an apparatus similar to that described in Example 1, a copolyester is prepared from a mixture of 19.4 g (0.1 mol) dimethyl terephthalate, 11.4 g (0.15 mol) 1,2-propanediol, 13.5 g (0.15 mol) 2,3-butanediol, and 0.15 g (4,000 ppm Sn) n-butylstannoic acid by heating at 180° C. for three hours, 200° C. for one hour, 220° C. for one hour, and then applying vacuum at 240° C. for one hour. An amber, transparent copolyester containing 50 mol % 2,3-butanediol and having an I.V. of 0.50 and a Tg of 113° C. is obtained.

EXAMPLE 3

Using the procedure described in Example 2, a copolyester is prepared from a mixture of 97.0 g (0.5 mol) dimethyl terephthalate, 36.0 g (0.25 mol) 1,4-cyclohexanedimethanol, 67.5 g (0.75 mol) 2,3-butanediol, and 0.44 g (2,000 ppm Sn) n-butylstannoic acid. A yellow, transparent copolyester containing 50 mol % 2,3-butanediol and having an I.V. of 0.53 and a Tg of 112° C. is obtained.

The copolyester is injection molded on conventional equipment to give tough, transparent shaped objects. Molding plastic properties are determined by ASTM methods. The molding plastic properties include a tensile strength of 7,800 psi and a flexural modulus of 280,000 psi. The copolyester is extruded on conventional equipment to give tough, transparent films.

EXAMPLE 4

Using the procedure described in Example 2, a polyester is prepared from a mixture of 15.5 g (0.08 mol) dimethyl terephthalate, 21.6 g (0.24 mol) (R)(R)-(−)-2,3-butanediol and 0.10 g (2,000 ppm Sn) n-butylstannoic acid. An amber, transparent polyester with an I.V. of 0.40 is obtained. The polyester is optically active and has a specific rotation, in acetone, of −9.9°.

The invention has been described in detail with particular reference to preferred embodiments thereof, but it will be understood that variations and modifications can be effected within the spirit and scope of the invention.

We claim:

1. Polyesters comprised of repeating units from an aromatic dicarboxylate moiety and 2,3-butanediol wherein at least 50 mol percent of the glycol component is 2,3-butanediol, said polyester having an inherent viscosity of at least 0.4.

2. Polyester according to claim 1 wherein the aromatic dicarboxylate moiety is selected from the group consisting of terephthalic acid and 2,6-naphthalenedicarboxylic acid.

3. Polyester according to claim 1 comprised of repeating units from terephthalic acid and a diol moiety selected from the group consisting of 2,3-butanediol, 1,2-ethanediol, 1,2-propanediol, 1,3-propanediol, 2,2-dimethyl-1,3-propanediol or 1,4-cyclohexanedimethanol wherein at least 50 mol percent of the diol moiety consists of a 2,3-butanediol moiety.

4. Polyester according to claim 1 and containing repeating units of up to 50 mol percent of an aliphatic glycol containing from 2 to 20 carbon atoms.

* * * * *